(12) United States Patent
Lee et al.

(10) Patent No.: US 10,679,096 B2
(45) Date of Patent: Jun. 9, 2020

(54) SYSTEM AND METHOD FOR PLANT LEAF IDENTIFICATION

(71) Applicant: KOREA INSTITUTE OF SCIENCE AND TECHNOLOGY, Seoul (KR)

(72) Inventors: Sang-Wook Lee, Seoul (KR); Junsik Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 259 days.

(21) Appl. No.: 15/921,586

(22) Filed: Mar. 14, 2018

(65) Prior Publication Data

US 2019/0065890 A1  Feb. 28, 2019

(30) Foreign Application Priority Data

Aug. 22, 2017  (KR) .................. 10-2017-0106228

(51) Int. Cl.
   *G06K 9/00*  (2006.01)
   *G06K 9/62*  (2006.01)
   (Continued)

(52) U.S. Cl.
   CPC ....... *G06K 9/6202* (2013.01); *G06K 9/00624* (2013.01); *G06K 9/44* (2013.01);
   (Continued)

(58) Field of Classification Search
   CPC .. G06K 2209/17; G06K 9/00624; G06K 9/44; G06K 9/4652; G06K 9/6202;
   (Continued)

(56) References Cited

U.S. PATENT DOCUMENTS

| 7,697,133 B2 | 4/2010 | Leyns et al. |
| 9,569,855 B2 | 2/2017 | Kim |

(Continued)

FOREIGN PATENT DOCUMENTS

| JP | 3918143 B2 | 5/2007 |
| JP | 2010-088407 A | 4/2010 |

(Continued)

OTHER PUBLICATIONS

Sekulska-Nalewajko J., Goclawski J. An image analysis method for the automatic measurement of selected morphological features of wheat shoots. Automatyka 15: 243-257. (Year: 2011).*

(Continued)

*Primary Examiner* — Ian L Lemieux
(74) *Attorney, Agent, or Firm* — Rabin & Berdo, P.C.

(57) ABSTRACT

A system for plant leaf identification includes: a plant image capturing unit which captures an image of a target plant to generate a plant image; a plant area image extraction unit which separates a background area and a plant area in the plant image to generate a plant area image including the plant area; a plant area image skeletonization unit which skeletonizes the plant area image to generate a skeletonized plant area image; a candidate leaf path generation unit which identifies a root vertex, a junction vertex and a leaf tip vertex in the skeletonized plant area image, and generates a plurality of candidate leaf paths by calculating all possible paths from the root vertex to the leaf tip vertex; and a final leaf path reconstruction unit which reconstructs a final leaf path matching the plant image by selecting the plurality of candidate leaf paths.

14 Claims, 11 Drawing Sheets

(51) Int. Cl.
*G06K 9/46* (2006.01)
*G06T 7/11* (2017.01)
*G06T 7/194* (2017.01)
*G06T 7/143* (2017.01)
*G06K 9/44* (2006.01)
*G06T 7/00* (2017.01)

(52) U.S. Cl.
CPC ......... *G06K 9/4652* (2013.01); *G06K 9/6215* (2013.01); *G06T 7/001* (2013.01); *G06T 7/11* (2017.01); *G06T 7/143* (2017.01); *G06T 7/194* (2017.01); *G06K 2209/17* (2013.01); *G06T 2207/10024* (2013.01); *G06T 2207/20041* (2013.01)

(58) Field of Classification Search
CPC ........ G06K 9/6215; G06T 2207/10024; G06T 2207/20041; G06T 7/001; G06T 7/11; G06T 7/143; G06T 7/194
See application file for complete search history.

(56) References Cited

U.S. PATENT DOCUMENTS

| | | | |
|---|---|---|---|
| 10,008,035 B1 * | 6/2018 | Redden | G06T 17/05 |
| 2008/0059076 A1 | 3/2008 | Choi et al. | |
| 2010/0142751 A1 | 6/2010 | Hirose | |
| 2012/0114240 A1 * | 5/2012 | Yamada | G06T 7/11 382/173 |

FOREIGN PATENT DOCUMENTS

| | | |
|---|---|---|
| KR | 10-2008-0022257 A | 3/2008 |
| KR | 10-2012-0076491 A | 7/2012 |
| KR | 10-1327482 B1 | 11/2013 |
| KR | 20-2014-0006440 U | 12/2014 |
| KR | 10-2016-0147374 A | 12/2016 |
| KR | 10-2017-0052416 A | 5/2017 |
| KR | 10-1743516 B1 | 6/2017 |

OTHER PUBLICATIONS

Jin-Mo Kim, "Contour-based Procedural Modeling of Leaf Venation Patterns", Journal of Korea Game Society, Oct. 2014, pp. 97-106, vol. 14, No. 5.
Anja Hartmann et al., "HTPheno: An image analysis pipeline for high-throughput plant phenotyping", BMC Bioinformatics, 2011, pp. 1-9, vol. 12, No. 148.
Christian Klukas et al., "Integrated Analysis Platform: An Open-Source Information System for High-Throughput Plant Phenotyping", Plant Physiology, Jun. 2014, pp. 506-518, vol. 165.
Jinhai Cai et al., "RootGraph: a graphic optimization tool for automated image analysis of plant roots", Journal of Experimental Botany, 2015, pp. 6551-6562, vol. 6, Issue 21.
Long Quan et al., "Image-based Plant Modeling", ACM transaction on graphics, 2006, pp. 599-604, vol. 25, No. 3.
Massimo Minervini et al., "Image-based plant phenotyping with incremental learning and active contours", Ecological Informatics, 2014, pp. 35-48, vol. 23.
Yann Chéné et al., "On the use of depth camera for 3D phenotyping of entire plants", Computers and Electronics in Agriculture, 2012, pp. 122-127, vol. 82.
Bernardino Romera-Paredes et al., "Recurrent Instance Segmentation", European Conference on Computer Vision, 2016, pp. 1-24.
Mengye Ren et al., "End-to-End Instance Segmentation with Recurrent Attention", IEEE Conference on Computer Vision and Pattern Recognition, 2017.

\* cited by examiner

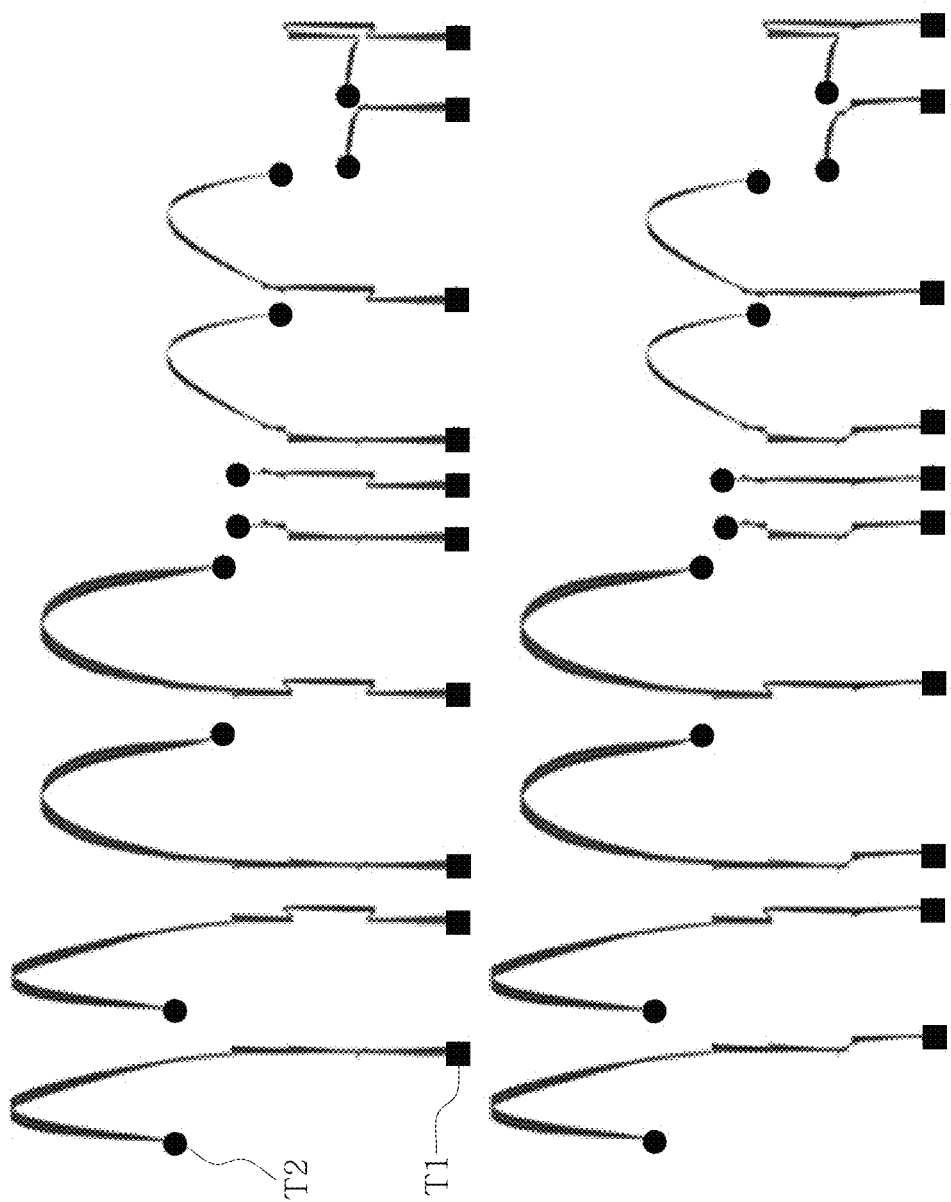

SYSTEM AND METHOD FOR PLANT LEAF IDENTIFICATION

DESCRIPTION OF GOVERNMENT-SPONSORED RESEARCH AND DEVELOPMENT

This research is done in support of Agricultural high-tech core technology development program (Development of image-based core crop expression body estimation technology, Project series number: 1395052884) of Rural Development Administration under the supervision of Korea Institute of Science and Technology.

CROSS-REFERENCE TO RELATED APPLICATION

This application claims priority to Korean Patent Application No. 10-2017-0106228, filed on Aug. 22, 2017, and all the benefits accruing therefrom under 35 U.S.C. § 119, the contents of which in its entirety are herein incorporated by reference.

BACKGROUND

1. Field

The present disclosure relates to a system and method for plant leaf identification, and more particularly, a system and method for plant leaf identification that not only wholly but also individually identifies plant leaves, allowing individual determination of the condition of the leaves.

2. Description of Related Art

With the rapid development in the field of genomics and genetics over the past ten years, an enormous amount of genome information of important plants has been accumulated and is available, but technology development in genomics will only lead to increased crop yield and added functionality when accompanied by technology development in the field of phenomics and phenotype analysis.

Phenomics is the field of research concerned with the function of cells, investigation of phenotypes of organisms and measurement the amount of phenotypes. In order to measure and document phenotypic information, individual analysis of target is required.

However, in phenomics, for individual analysis of plants, i.e., analysis of individual leaves of plants, a labor intensive and time consuming analysis method requiring persons to identify themselves has been used so far.

To keep pace with genomics and substantially contribute to the increased crop yield, phenomics needs high-throughput, automated individual leaf analysis technology.

SUMMARY

The present disclosure is designed to solve the above-mentioned problem, and provides a system and method for plant leaf identification that automatically identifies even individual leaves of a plant.

In accordance with an aspect of the present invention, a system for plant leaf identification includes: a plant image capturing unit which captures an image of a target plant to generate a plant image; a plant area image extraction unit which separates a background area and a plant area in the plant image to generate a plant area image including the plant area; a plant area image skeletonization unit which skeletonizes the plant area image to generate a skeletonized plant area image; a candidate leaf path generation unit which identifies root vertices, junction vertices and leaf tip vertices in the skeletonized plant area image, and generates a plurality of candidate leaf paths by calculating all possible paths from the root vertices to the leaf tip vertices; and a final leaf path reconstruction unit which reconstructs a final leaf path set matching the plant image by selecting the plurality of candidate leaf paths.

The plant area image extraction unit determines an initial plant area and an initial background area through Laplacian filtering, and separates the initial plant area and the initial background area as a plant area and a background area according to a color distribution probability model for the plant area and a color distribution probability model for the background area.

The plant area image extraction unit updates each parameter by reflecting parameter values determined as the plant area and the background area on the color distribution probability model for the plant area and the color distribution probability model for the background area, and repeats the separation of the plant area and the background area using the updated distribution probability model, and the separation of the plant area and the background area repeats until the parameter of the color distribution probability model for the plant area and the parameter of the color distribution probability model for the background area are not updated any longer.

The skeletonized plant area image includes a thinned plant area represented by black thin lines, and pixels included in the thinned plant area are identified to be the root vertices, the junction vertices or the leaf tip vertices according to characteristics of eight neighbor pixels surrounding each pixel.

When at least three of the eight neighbor pixels surrounding a pixel correspond to the thinned plant area, the candidate leaf path generation unit identifies the pixel to be the junction vertex.

The final leaf path reconstruction unit calculates a slope of each pixel corresponding to the thinned plant area, and calculates a leaf path likelihood of every candidate leaf path as an indicator indicating slope similarity of the pixel and neighboring pixels.

The final leaf path reconstruction unit determines a path set in which a sum of cost functions of a path graph composed of the junction vertex, the root vertex, the leaf tip vertex and edges is minimum to be the final leaf path, and the final leaf paths are determined to include all the edges.

In accordance with another aspect of the present invention, a method for plant leaf identification includes: capturing, by a system for plant leaf identification, an image of a target plant to generate a plant image; separating, by the system for plant leaf identification, a plant area and a background area in the plant image to generate a plant area image including the plant area; skeletonizing, by the system for plant leaf identification, the plant area image to generate a skeletonized plant area image; identifying, by the system for plant leaf identification, root vertices, junction vertices and leaf tip vertices in the skeletonized plant area image, and generating a plurality of candidate leaf paths by calculating all possible paths from the root vertices to the leaf tip vertices; and reconstructing, by the system for plant leaf identification, a final leaf path set matching the plant image by selecting the plurality of candidate leaf paths.

The generating of a plant area image comprises: determining an initial plant area and an initial background area through Laplacian filtering; and separating the initial plant area and the initial background area as a plant area and a background area according to a color distribution probability model for the plant area and a color distribution probability model for the background area.

The separation of a plant area and a background area comprises updating each parameter by reflecting parameter values determined as the plant area and the background area on the color distribution probability model for the plant area and the color distribution probability model for the background area, and repeatedly performing the separation of the plant area and the background area using the updated distribution probability model, and the repeatedly performing of the separation of the plant area and the background area repeats until the parameter of the color distribution probability model for the plant area and the parameter of the color distribution probability model for the background area are not updated any longer.

The skeletonized plant area image includes a thinned plant area represented by black thin lines, and pixels included in the thinned plant area are identified to be the root vertices, the junction vertices or the leaf tip vertices according to characteristics of eight pixels surrounding the pixel.

When at least three of the eight neighbor pixels surrounding a pixel correspond to the thinned plant area, the pixel is identified to be the junction vertex.

The reconstructing of a final leaf path comprises calculating a slope of each pixel corresponding to the thinned plant area, and calculating a leaf path likelihood of each candidate leaf path as an indicator indicating slope similarity of the pixel and neighboring pixels.

The reconstructing of a final leaf path set comprises determining a path set in which a sum of cost functions of a path graph composed of the junction vertices, the root vertices and the leaf tip vertices is minimum to be the final leaf path set, and the final leaf path set is determined to include all the edges.

The system for plant leaf identification according to an embodiment of the present disclosure has advantages because it allows individual identification of plant leaves and achieves accurate and easy reconstruction of the whole plant shape from the identified individual leaves. Additionally, as the processing operation of the elements of the system is provided in an automated and high-speed manner, a faster and improved system for plant leaf identification may be provided.

BRIEF DESCRIPTION OF THE DRAWINGS

The above and other features and aspects of the present invention will become more apparent by describing in detail example embodiments thereof with reference to the attached drawings in which:

FIG. 5 is an illustrative diagram showing a plurality of candidate leaf paths calculated by a candidate leaf path generation unit.

DETAILED DESCRIPTION

Figure 1:
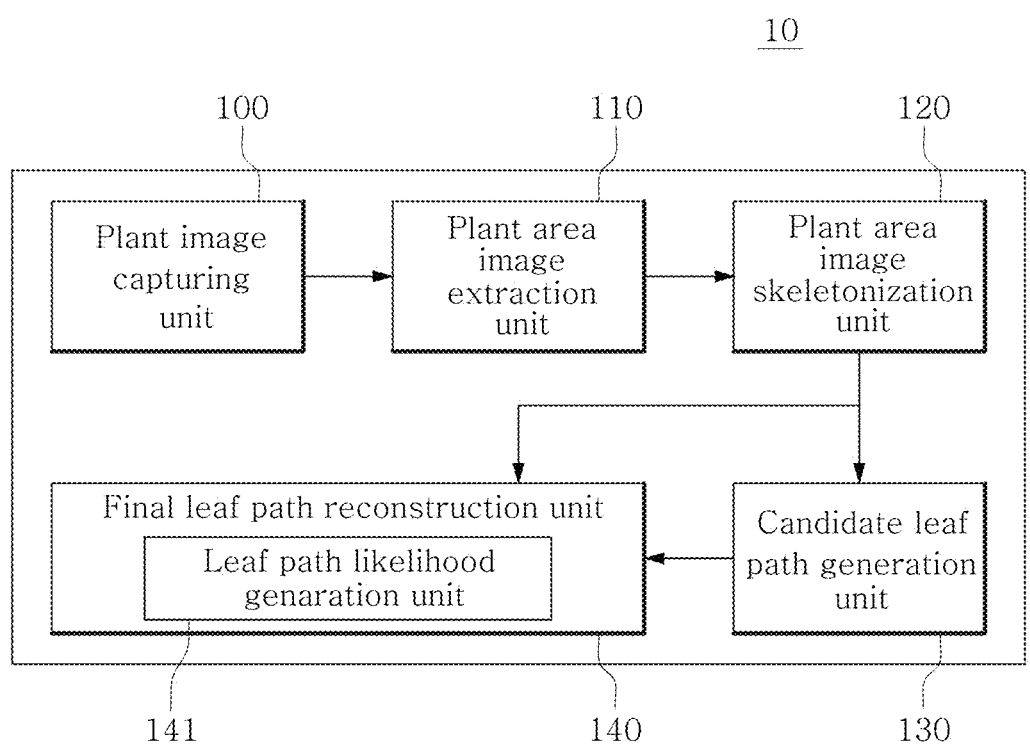
FIG. 1 is a schematic block diagram of a system for plant leaf identification according to an embodiment.

The present disclosure is described in detail as below with reference to the accompanying drawings in which particular embodiments for carrying out the present disclosure are shown for illustration. These embodiments are described in sufficient detail to enable those skilled in the art to practice the present disclosure. Various embodiments of the present disclosure are different from each other, but they do not need to be exclusive. For example, a particular shape, structure and characteristic described herein, in connection with one embodiment, may be implemented in other embodiments without departing from the spirit and scope of the present disclosure. Further, modification may be made to the position or arrangement of respective elements in each disclosed embodiment without departing from the spirit and scope of the present disclosure. Therefore, the following detailed description is not intended to make in a limitative sense, and the scope of the present disclosure is only defined by the appended claims, if appropriately described, along with the full scope of equivalents to which the claims are entitled. In the drawings, similar reference numerals denote same or similar functions throughout many aspects.

The terms as used herein are general terms selected as those being now used as widely as possible in consideration of functions, but they may vary depending on the intention of those skilled in the art or the convention or the emergence of new technology. Additionally, in a certain case, there may be terms arbitrarily selected by the applicant, and in this case, the meaning will be described in the corresponding description part of the specification. Accordingly, the terms as used herein should be interpreted based on the substantial meaning of the terms and the content throughout the specification, not simply the name of the terms.

Figure 2:
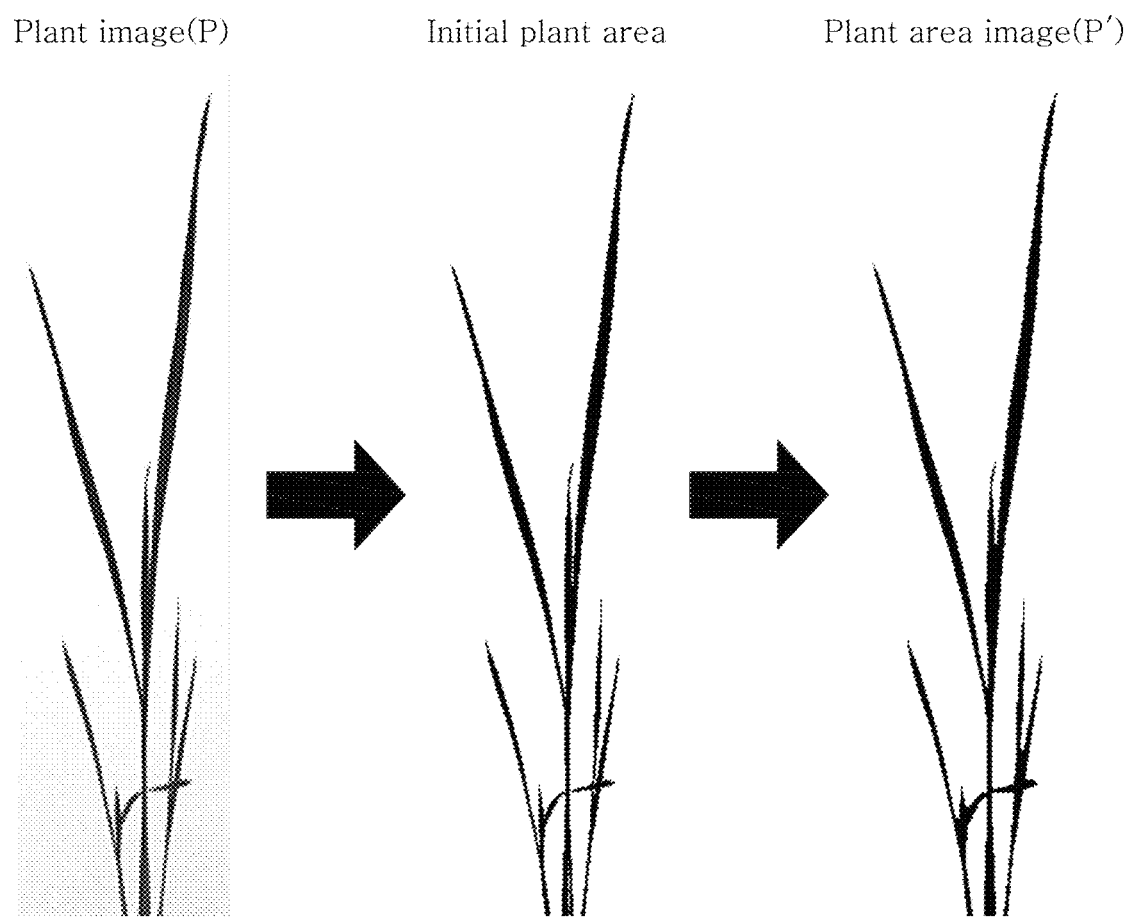
FIG. 2 is an illustrative diagram showing a process of extracting a plant area image.
Figure 3:
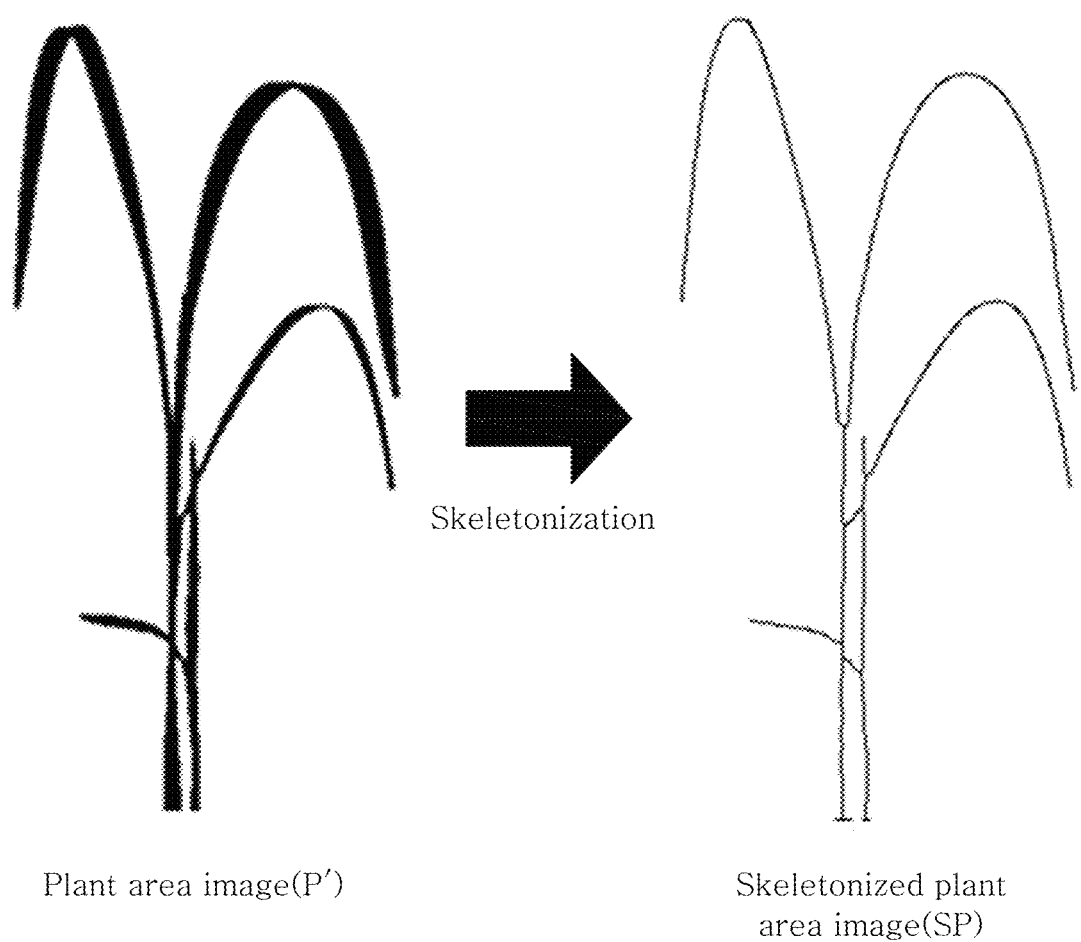
FIG. 3 is an illustrative diagram showing a process of skeletonizing a plant area image.
Figure 4A:
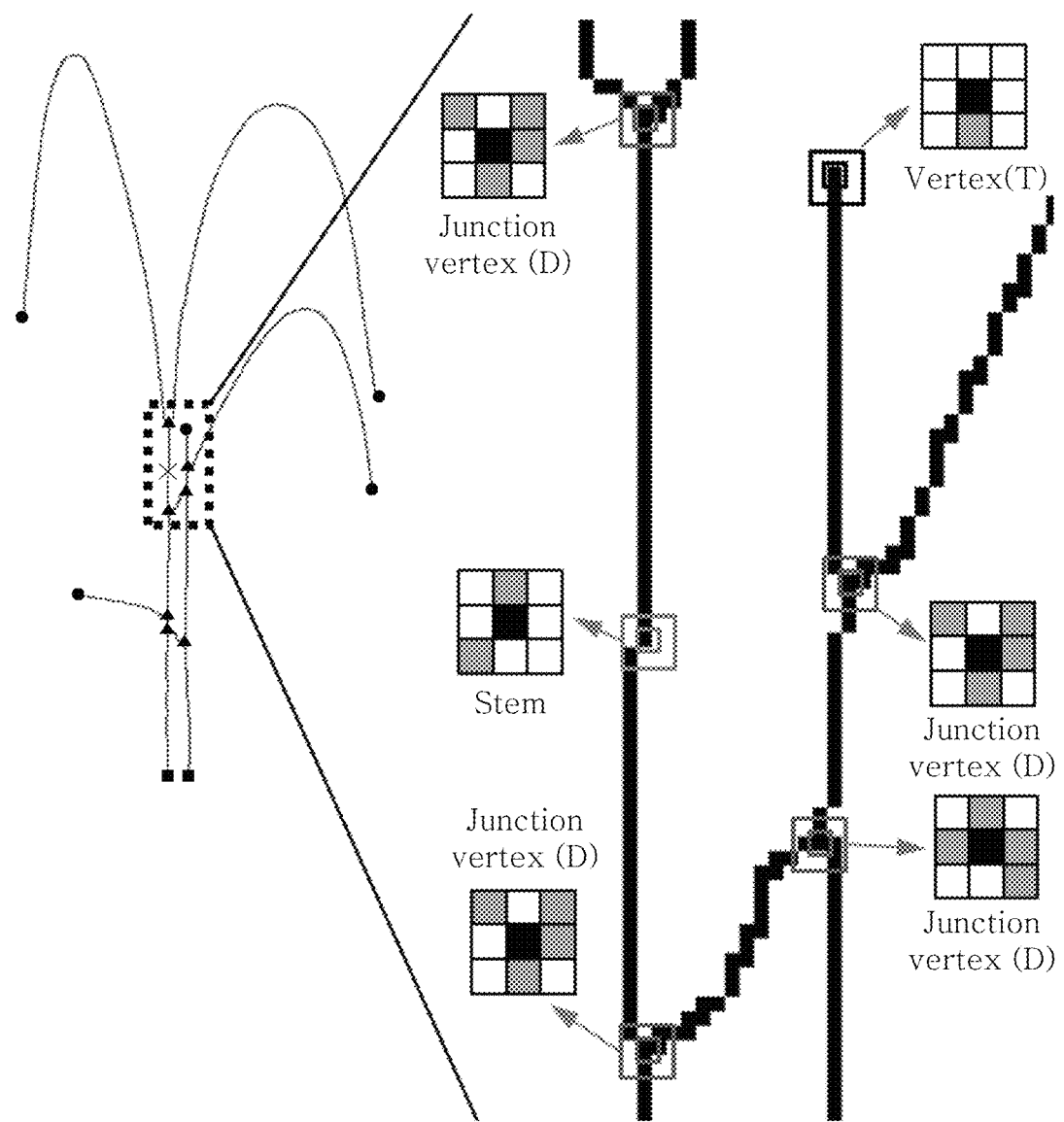
FIGS. 4A and 4B are illustrative diagrams showing a method for identifying a vertex and a junction vertex in a skeletonized plant area image.
Figure 4B:
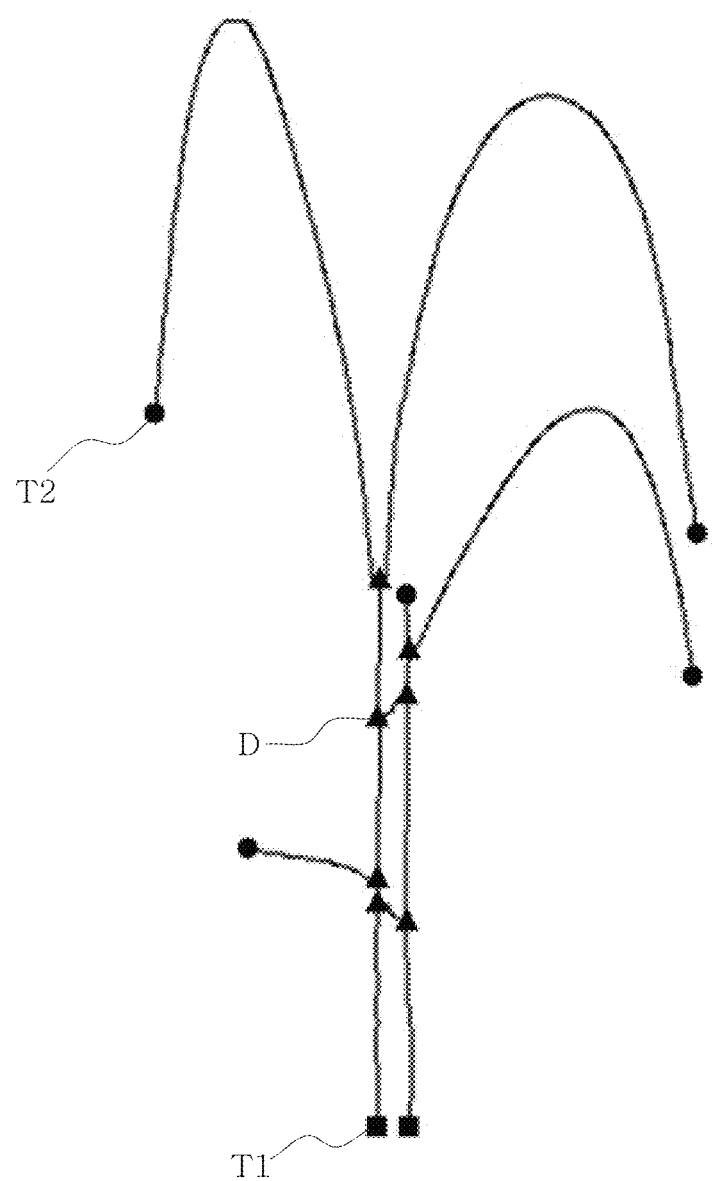

FIG. 1 is a schematic block diagram of a system for plant leaf identification according to an embodiment. FIG. 2 is an illustrative diagram showing a process of extracting a plant area image. FIG. 3 is an illustrative diagram showing a process of skeletonizing a plant area image. FIGS. 4A and 4B are illustrative diagrams showing a method for identifying a vertex and a junction vertex in a skeletonized plant area image. FIG. 5 is an illustrative diagram showing a plurality of candidate leaf paths calculated by a candidate leaf path generation unit. FIGS. 6A to 6D are graphs of the calculation of leaf path likelihood of a candidate leaf path.

Referring to FIGS. 1 to 6D, a system 10 for plant leaf identification according to this embodiment includes a plant image capturing unit 100, a plant area image extraction unit 110, a plant area image skeletonization unit 120, a candidate leaf path generation unit 130, and a final leaf path reconstruction unit 140. The system for plant leaf identification according to the embodiments and each device or unit that makes up the system may have aspects of entirely hardware, or partly hardware and partly software. For example, each element of the system for plant leaf identification is intended to refer to a combination of hardware and software that runs by the corresponding hardware. The hardware may be a data processing device including a central processing unit (CPU) or other processor. Further, the software that runs by the hardware may refer to a process being executed, an object, an executable, a thread of execution and a program. For example, the plant image capturing unit 100 may refer to a combination of hardware for capturing an image of a target and software that controls the hardware to capture an image and performs image processing to convert to a shape for subsequent processing.

The plant image capturing unit 100 may capture an image of a target plant to generate a plant image P. The plant image capturing unit 100 may include an image sensor to measure the image of the plant. The plant image capturing unit 100 may capture an image of the target plant in front to generate the plant image P. However, the present disclosure is not limited thereto, and in other embodiments, the plant image capturing unit 100 may capture an image of the target plant in at least one direction of front, rear, left, right, and top views.

Here, a space for capturing an image of the target plant may be a space having a mono-colored background for easy plant leaf extraction as described below. Specifically, the space may be a space having the background of a color that is compared to or easy to distinguish from the plant leaves, or a color forming a complementary color relationship with the plant leaves, but is not limited thereto. The target plant may be photographed while sequentially going through a photographing place with a conveyor system, but is not limited thereto. The generated plant image P may be provided to the plant area image extraction unit 110.

As shown in FIG. 2, the plant area image extraction unit 110 may separate a plant area and a background area in the plant image P. The plant area image extraction unit 110 may distinguish the plant area and the background area by applying modified GrabCut algorithm. The modified GrabCut algorithm according to the present embodiment label pixels as plant area or background area only instead of using a trimap which is required for border matting in the original grabcut algorithm. The plant area image extraction unit 110 includes a color distribution probability model for the plant area and a color distribution probability model for the background area, and based on this, may separate the plant area and the background area without a user's intervention. The plant area image extraction unit 110 may determine an initial plant area and an initial background area through Laplacian filtering. The existing background area and plant area given by the user may be replaced with the results of Laplacian filtering. The plant area image extraction unit 110 may extract the initial plant area through Laplacian filtering. The Laplacian filtering separates two areas with rough boundaries located therebetween, and as shown in FIG. 2, a seam or hole may be present in the plant area. Therefore, the pixels designated as the initial plant areas are not fixed thereto but can be newly updated in the following process.

Subsequently, a noise component of the surroundings may be removed through a morphological operation.

The initial plant area and the initial background area may be respectively determined to be a plant area and a background area according to the color distribution probability model for the plant area and the color distribution probability model for the background area. Subsequently, separation of the plant area and the background area may be repeatedly performed over the whole until parameters of each color distribution probability model do not change any longer through expectation maximization algorithm (EM algorithm).

The parameter values determined as the plant area and the background area may be respectively updated to the color distribution probability model for the plant area and the color distribution probability model for the background area, and separation of the plant area and the background area may be newly performed by the updated probability model. The plant area image extraction unit 110 may repeatedly perform this separation until the parameters of the color distribution probability model are not updated any longer, to generate a final plant area image P' optimized such that the plant area has no seam or hole. The plant area image P' may include a plant area represented in black.

The plant area image extraction unit 110 according to this embodiment may separate the plant area and the background area in the above order, but a method and order of separating each area is not limited thereto.

The plant area image skeletonization unit 120 may convert the plant area image P' to a skeletonized plant area image SP. That is, the plant area image skeletonization unit 120 may skeletonize the plant area image P'. Here, as shown in FIG. 3, skeletonization is a process of thinning such that the plant area has a uniform pixel size irrespective of the real thickness of the plant, and may be performed through a thinning algorithm. Accordingly, the skeletonized plant area image SP may include a plant area represented by black thin lines. The skeletonized plant area image SP is an image showing the whole skeleton of the target plant, and based on this, candidate leaf path generation and final leaf path reconstruction as described below may be performed. The plant area image skeletonization unit 120 may provide the skeletonized plant area image SP to the candidate leaf path generation unit 130 and the final leaf path reconstruction unit 140.

The candidate leaf path generation unit 130 may identify a vertex T and a junction vertex D in the skeletonized plant area image. The candidate leaf path generation unit 130 may identify one pixel included in the skeletonized plant area image to be a vertex T or a junction vertex D through a relationship between the pixel and eight pixels surrounding it. That is, in this embodiment, the candidate leaf path generation unit 130 may analyze a relationship between a target pixel and eight pixels surrounding it in one layer, but this is for illustration only and in other embodiment, the candidate leaf path generation unit 130 may identify the vertex T and the junction vertex D by analyzing a relationship between a reference pixel and a larger number of pixels surrounding it in more than two layers.

FIG. 4A shows a relationship between the skeletonized plant area image and the pixel group, and FIG. 4B is an illustrative diagram showing that each pixel of the skeletonized plant area image is classified into a vertex T or a junction vertex D. In each pixel of the skeletonized plant area image, a region not classified as a vertex T or a junction vertex D may correspond to a stem.

In FIG. 4A, a pixel including the skeletonized plant area image is shown as a black pixel. It can be seen that a pixel corresponding to the stem has two black pixels surrounding it. That is, it can be seen that two plant areas are continuous with respect to the corresponding pixel. It can be seen that a pixel corresponding to the junction vertex D has at least three black pixels surrounding it. That is, it is a node at which one stem branches into at least two with respect to the corresponding pixel. It can be seen that the vertex T has one black pixel surrounding it. That is, the vertex T is final and is a point at which the stem does not extend or branch any longer, and the number of neighboring black pixels is one. Here, the vertex T may be divided into a root vertex T1 and a leaf tip vertex T2. The candidate leaf path generation unit 130 may set a vertex positioned at the bottommost of the skeletonized plant area image as the root vertex T1.

After setting each of the root vertex T1, the junction vertex D and the leaf tip vertex T2 as described above, the candidate leaf path generation unit 130 may calculate all possible paths from the set root vertex T1 to the set leaf tip vertex T2 to generate a plurality of candidate leaf paths. The candidate leaf path generation unit 130 may extract all leaf paths from the root vertex T1 upward the leaf tip vertex T2 using a graph search algorithm. The leaf path may include a path including at least one junction vertex D, but may include a path with no junction vertex D connected from the root vertex T1 to the leaf tip vertex T2. A plurality of candidate leaf paths shown in FIG. 5 may be extracted from the skeletonized plant area image of FIG. 4B through a graph search algorithm. The plurality of candidate leaf paths are generated taking into account all possible cases and may also include a path that cannot be implemented by a real plant leaf. The candidate leaf path generation unit 130 may provide the root vertex T1, the junction vertex D, the leaf tip vertex T2 and the plurality of candidate leaf paths to the final leaf path reconstruction unit 140.

The final leaf path reconstruction unit 140 may reconstruct a final leaf path set matching the plant image by selecting the plurality of candidate leaf paths. The final leaf path reconstruction unit 140 may reconstruct a whole final leaf path set based on individual leaf identification in consideration of the individual properties of the plant leaves as well as the whole properties of the whole plant.

First, the final leaf path reconstruction unit 140 may calculate a leaf path likelihood Ip from the plurality of generated candidate leaf paths. The final leaf path reconstructing unit 140 may further include a leaf path likelihood generation unit 141 for calculating the leaf path likelihood Ip. In another embodiment, the leaf path likelihood generation unit 141 may be configured as a separate unit from the final leaf path reconstructing unit 140. In the other embodiment, leaf path likelihood generation unit 141 may be configured to be included in candidate leaf path generation unit 130.

Here, the leaf path likelihood Ip may be an indicator for evaluating how much the extracted individual candidate leaf path is similar to a real leaf. The final leaf path reconstruction unit 140 may calculate the slope of each pixel in the skeletonized plant area image, and may calculate how much the slope of each pixel is similar to neighboring pixels using the concentration k of von Mises distribution. Additionally, the concentration k of pixel corresponding to each of the plurality of candidate leaf paths may be depicted as the leaf path likelihood Ip.

Figure 6A:
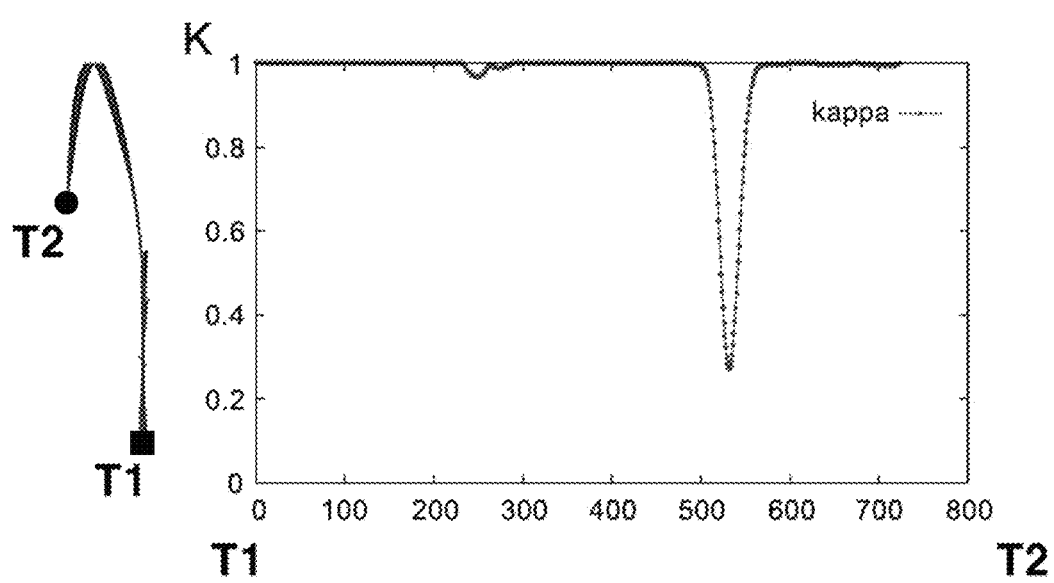
FIGS. 6A to 6D are graphs of the calculation of leaf path likelihood of a candidate leaf path.
Figure 6B:
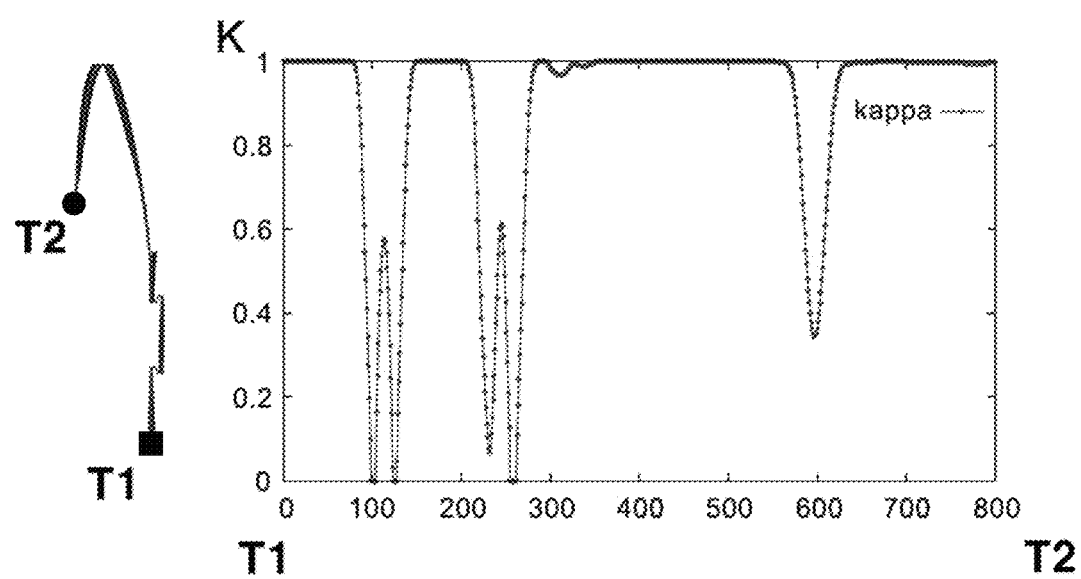
Figure 6C:
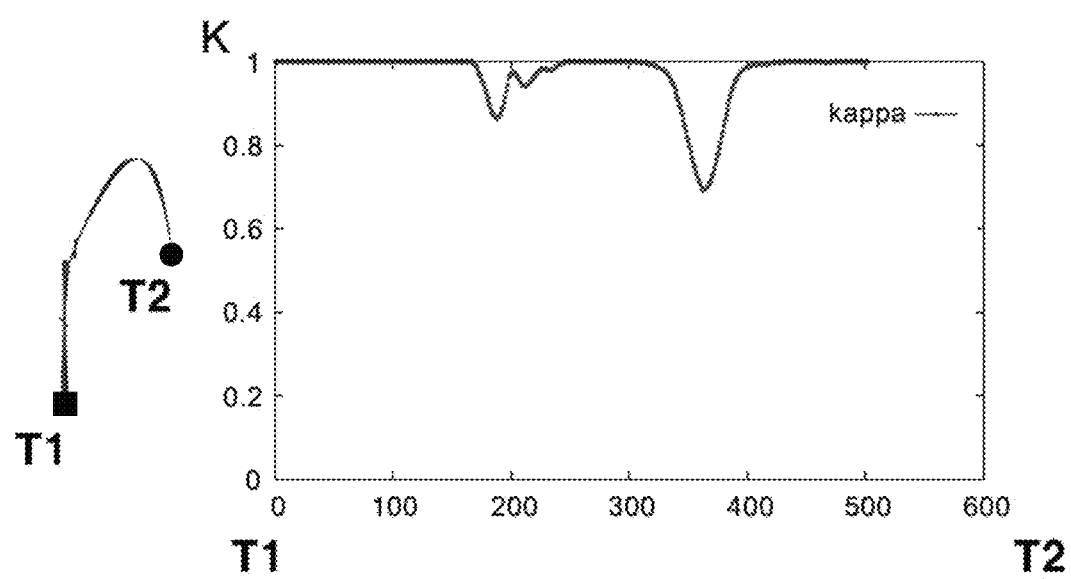
Figure 6D:
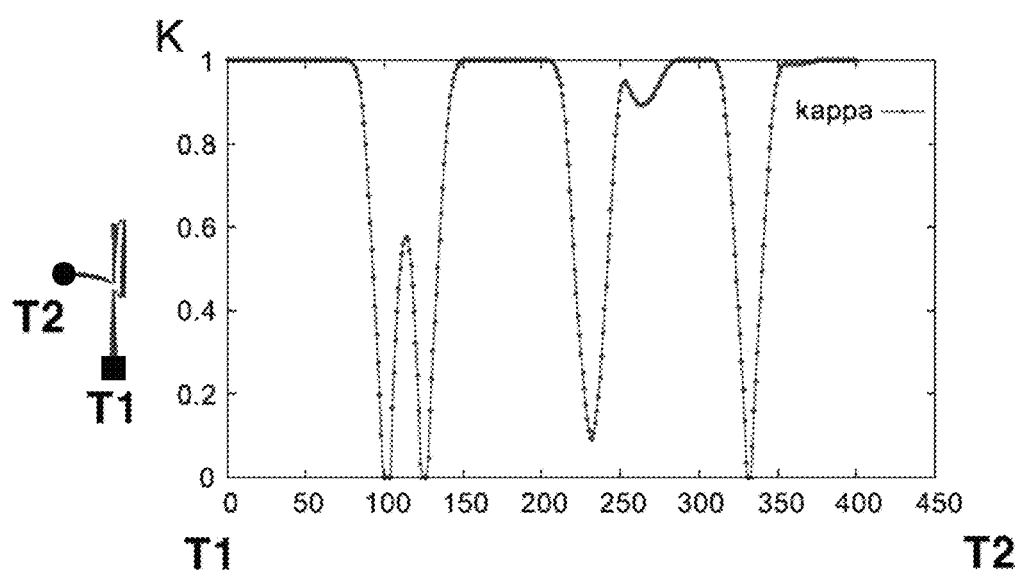

As shown in FIGS. 6A to 6D, the leaf path likelihood Ip shows a change in slope of the leaf path. In the graphs of FIGS. 6A to 6D, the X axis denotes a leaf path from the root vertex T1 to the leaf tip vertex T2, and the Y axis denotes concentration k of each pixel positioned on the path. In the graph, it can be seen that a region in which the angle sharply changes has low concentration k. As in FIGS. 6B and 6D, a leaf path having a large number of regions in which the angle sharply changes may be a leaf path that cannot be derived by plant morphology, and may not correspond to a real leaf. In the case of FIGS. 6A and 6C showing an angle change that may appear in a real leaf, the corresponding leaf candidate path may be a path of the real leaf. Each leaf path likelihood Ip calculated by the final leaf path reconstruction unit 140 may be not only data for analyzing individual properties of individual leaves but also data for determining the whole final leaf path.

The final leaf path reconstruction unit 140 may reconstruct the whole final leaf path in consideration of the root vertex, the junction vertex, the leaf tip vertex and the leaf path likelihood Ip. That is, the final leaf path reconstruction unit 140 may reconstruct the whole plant shape graph by analyzing not only smoothness or naturalness of individual leaves but also whether the identified leaves may fully construct the whole plant.

Here, the final leaf path reconstruction unit 140 according to this embodiment may determine a final leaf path through a minimum path cover algorithm. In the path graph {G=(V, E)} composed of the node set V (including the root vertex, the leaf tip vertex and the junction vertex) and the edge set E (connection between Nodes), a path set in which the sum of cost functions of the leaf path is minimum is calculated as the final leaf path set, and all the edges should be used at least once. All the edges E should be included in the final leaf path set. If even a path calculated to be similar to a real leaf through analysis of the leaf path likelihood Ip in the candidate leaf paths corresponds to a path that excludes a connection to a specific edge, it cannot fully construct the whole plant shape, and thus such a candidate leaf path may be excluded. The minimum path cover algorithm may be summarized as in the following [Equation 1].

$$\min \sum_{p \in P} c(p) x_p \qquad \text{[Equation 1]}$$

$$\text{subject to } \sum_{p \in P_e} x_p \geq 1, \forall e \in E$$

$$x_p \in \{0, 1\}, \forall p \in P$$

V: a set of all vertices, E: a set of all edges, P: a set of all possible paths in the path graph, $P_e$: a set of paths including an edge e, the set being included in P, c(p): a cost function of a leaf path p, $x_p$: a binary variable for determining if a leaf path p is present in the path cover Here, the cost function [c(p)] of a leaf path p may be calculated through each path likelihood Ip of the candidate leaf path as in the following [Equation 2], and accordingly, a path not having a smooth shape such as the shape of a real plant leaf may have a disadvantage in the minimum path value calculation.

$$c(p) = -l(p) = \sum_{n \in N_p} (1 - \kappa_n) \qquad \text{[Equation 2]}$$

$N_p$: a set of neighboring pixels of all pixels of a leaf path p, $k_n$: slope similarity with a neighbor n As described above, the final leaf path reconstruction unit 140 may calculate a final leaf path set in which the final sum of cost functions of the leaf path p is minimum. The plant shape graph reconstruction problem is one of integer linear optimization problems, and a result value may be derived through combinatorial optimization technique such as well-known Bound-and-Cut algorithm.

The reconstructed final leaf path set is a combination of individual paths corresponding to individual leaves of the target plant, and may be data showing not only the properties of individual leaves but also the properties of the whole plant. That is, the reconstruction process of the final leaf path set makes use of information of local and individual viewpoint using the previously calculated leaf path likelihood, and is a process of reconstructing a plant shape graph as perfectly as possible from the subset of candidate leaf paths extracted in the previous process, and may totally reflect the structural properties of the plant over the whole.

The system for plant leaf identification 10 according to this embodiment may further include a plant leaf identification unit (not shown) to not only individually but also wholly identify the plant leaves through the reconstructed final leaf path.

The system for plant leaf identification according to an embodiment of the present disclosure has advantages because it allows individual identification of the plant leaves, and achieves accurate and easy reconstruction of the whole plant shape from the identified individual leaves. Additionally, as the processing operation of the elements of the system is provided in an automated and high-speed manner, a faster and improved system for plant leaf identification may be provided.

Figure 7:
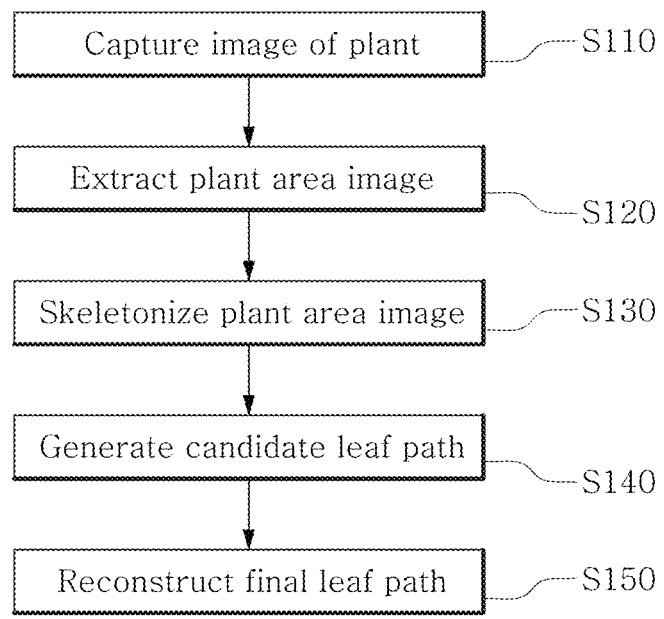
FIG. 7 is a flowchart of the method for plant leaf identification according to an embodiment of the present disclosure.

Hereinafter, a method for plant leaf identification according to an embodiment of the present disclosure will be described. FIG. 7 is a flowchart of the method for plant leaf identification according to an embodiment of the present disclosure.

Referring to FIG. 7, the method for plant leaf identification according to an embodiment of the present disclosure includes a plant image capturing step S110, a plant area image extraction step S120, a plant area image skeletonization step S130, a candidate leaf path generation step S140, and a final leaf path reconstruction step S150.

Here, a system for plant leaf identification that performs each of the above-mentioned steps may be the system 10 for plant leaf identification of FIG. 1 described above, and its detailed description is omitted herein. Additionally, a reference may be made to FIGS. 1 to 6D for description of this embodiment.

First, an image of a plant is captured (S110).

The system 10 for plant leaf identification may include the plant image capturing unit 100, the plant area image extraction unit 110, the candidate leaf path generation unit 130 and the final leaf path reconstruction unit 140, and capturing an image of a plant may be performed by the plant image capturing unit 100.

The step for capturing an image of a target plant to generate a plant image P may be performed by the plant image capturing unit 100. The plant image capturing unit 100 may include an image sensor to measure the image of the plant. The plant image capturing unit 100 may capture an image of the target plant in front to generate the plant image P. However, the present disclosure is not limited thereto, and in other embodiments, the plant image capturing unit 100 may capture an image of the target plant in at least one direction of front, rear, left, right and top views. The generated plant image P may be provided to the plant area image extraction unit 110.

Subsequently, a plant area image may be extracted (S120).

The extraction of a plant area image may be performed by the plant area image extraction unit 110. The plant area image extraction unit 110 includes a color distribution probability model for a plant area and a color distribution probability model for a background area, and based on this, may separate a plant area and a background area without a user's intervention.

The plant area image extraction unit 110 may determine an initial plant area and an initial background area through Laplacian filtering. The plant area image extraction unit 110 may extract an initial plant area through Laplacian filtering.

Subsequently, a noise component of the surroundings may be removed through a morphological operation. The initial plant area and the initial background area may be respectively determined to be a plant area and a background area according to the color distribution probability model for the plant area and the color distribution probability model for the background area. Subsequently, separation of the plant area and the background area may be repeatedly performed over the whole until parameters of each color distribution probability model do not change any longer through an expectation maximization algorithm (EM algorithm), and finally, a plant area image P' may be generated. The final plant area image P' may include a plant area represented in black.

The plant area image extraction unit 110 according to this embodiment may separate the plant area and the background area in the above-mentioned method and order, but the method and order of separating each area is not limited thereto.

Subsequently, the plant area image may be skeletonized (S130).

The skeletonization of the plant area image P' may be generated by the plant area image skeletonization unit 120. The plant area image skeletonization unit 120 may convert the plant area image P' to a skeletonized plant area image SP. Here, skeletonization may be a process of thinning such that the plant area has a uniform pixel size irrespective of the real thickness of the plant, and may be performed through a thinning algorithm. Accordingly, the skeletonized plant area image SP may include a plant area represented by a black thin line.

Subsequently, a candidate leaf path may be generated (S140).

The candidate leaf path generation unit 130 may identify a vertex T and a junction vertex D in the skeletonized plant area image. The candidate leaf path generation unit 130 may identify one pixel included in the skeletonized plant area image to be a vertex T or a junction vertex D through a relationship between the pixel and eight neighbor pixels surrounding it. That is, in this embodiment, the candidate leaf path generation unit 130 may analyze a relationship between a target pixel and eight pixels surrounding it in one layer, but this is for illustration only and in other embodiment, the candidate leaf path generation unit 130 may identify the vertex T and the junction vertex D by analyzing a relationship between a reference pixel and a larger number of pixels surrounding it in more than two layers.

After setting each of the root vertex T1, the junction vertex D and the leaf tip vertex T2, the candidate leaf path generation unit 130 may calculate all possible paths from the set root vertex T1 to the set leaf tip vertex T2 to generate a plurality of candidate leaf paths. The candidate leaf path generation unit 130 may extract all leaf paths from the root vertex T1 upward the leaf tip vertex T2 using a graph search algorithm. The leaf path may include a path including at least one junction vertex D, but may include a path with no junction vertex D connected from the root vertex T1 to the leaf tip vertex T2. The plurality of candidate leaf paths are generated taking into account all possible cases and may also include a path that cannot be implemented by a real plant leaf.

Finally, a final leaf path reconstruction step (S150) may be included.

A final leaf path set matching the plant image may be reconstructed by selecting the plurality of candidate leaf paths. The final leaf path reconstruction step may be performed by the final leaf path reconstruction unit 140. The final leaf path reconstruction unit 140 may reconstruct a whole final leaf path set based on individual leaf identification in consideration of the individual properties of the plant leaves as well as the whole properties of the whole plant.

The final leaf path reconstruction unit 140 may calculate a leaf path likelihood Ip from the plurality of generated candidate leaf paths. Here, the leaf path likelihood Ip may be an indicator for evaluating how much the extracted individual candidate leaf path is similar to a real leaf. The final leaf path reconstruction unit 140 may calculate the slope of each pixel in the skeletonized plant area image, and may calculate how much the slope of each pixel is similar to neighboring pixels using the concentration k of von Mises distribution. Additionally, the concentration k of pixel corresponding to each of the plurality of candidate leaf paths may be depicted as the leaf path likelihood Ip. The leaf path likelihood Ip shows a change in slope of the leaf path, and it can be seen that a region in which the angle sharply changes has low concentration k. A leaf path having a large number of regions in which the angle sharply changes may be a leaf path that cannot be derived by plant morphology, and may not correspond to a real leaf. That is, each calculated leaf path likelihoods Ip may be not only data for analyzing individual properties of individual leaves but also data for determining the whole final leaf path. In this embodiment, although the step of generating the leaf path likelihood is described as including in the final leaf path reconstruction step (S150), the present invention is not limited thereto. In another embodiment, generating the leaf path likelihood may be an independent step. In the other embodiment, the step of generating the leaf path likelihood may be included in the candidate leaf path generating step (S140).

The final leaf path reconstruction unit 140 may reconstruct the whole final leaf path set in consideration of the root vertex, the junction vertex, the leaf tip vertex and the leaf path likelihood Ip. That is, the final leaf path reconstruction unit 140 may reconstruct the whole plant shape graph by analyzing not only smoothness or naturalness of individual leaves but also whether the identified leaves may fully construct the whole plant.

The final leaf path reconstruction unit 140 according to this embodiment may determine a final leaf path set through a minimum path cover algorithm. In the path graph {G=(V, E)} composed of the node set V (including the root vertex, the leaf tip vertex and the junction vertex) and the edge set E (connection between Nodes), a path set in which the sum of cost functions of the leaf path is minimum is calculated as the final leaf path set, and all the edges should be used at least once. All the edges E should be included in the final leaf path set. If even a path calculated to be similar to a real leaf through analysis of the leaf path likelihood Ip in the candidate leaf paths corresponds to a path that excludes a connection to a specific edge, it cannot fully construct the whole plant shape, and thus such a candidate leaf path may be excluded. The minimum path cover algorithm may be summarized as in the following [Equation 1].

$$\min \sum_{p \in P} c(p)x_p \qquad \text{[Equation 1]}$$

$$\text{subject to} \sum_{p \in P_e} x_p \geq 1, \forall e \in E$$

$$x_p \in \{0, 1\}, \forall p \in P$$

V: a set of all vertices, E: a set of all edges, P: a set of all possible paths in the path graph, $P_e$: a set of paths including an edge e, the set being included in P, c(p): a cost function of a leaf path p, $x_p$: if a leaf path p is present in the path cover Here, the cost function [c(p)] of a leaf path p may be calculated through each path likelihood Ip of the candidate leaf path as in the following [Equation 2], and accordingly, a path not having a smooth shape such as the shape of a real plant leaf may have a disadvantage in the minimum path value calculation.

$$c(p) = -l(p) = \sum_{n \in N_p} (1 - \kappa_n) \qquad \text{[Equation 2]}$$

$N_p$: a set of neighboring pixels of all pixels of a leaf path p, $k_n$: slope similarity with a neighbor n As described above, the final leaf path reconstruction unit 140 may calculate a final leaf path set in which the final sum of cost functions of the leaf path p is minimum. The plant shape graph reconstruction problem is one of integer linear optimization problems, and a result value may be derived through combinatorial optimization technique such as well-known Bound-and-Cut algorithm.

The reconstructed final leaf path set is a combination of individual paths corresponding to individual leaves of the target plant, and may be data showing not only the properties of individual leaves but also the properties of the whole plant. That is, the reconstruction process of the final leaf path set makes use of information of local and individual viewpoint using the previously calculated leaf path likelihood, and is a process of reconstructing a plant shape graph as perfectly as possible from the subset of candidate leaf paths extracted in the previous process, and may totally reflect the structural properties of the plant over the whole.

The system for plant leaf identification according to an embodiment of the present disclosure may further include comparatively identifying the reconstructed final leaf path set with the target plant.

As described above, the method for plant leaf identification according to an embodiment of the present disclosure has advantages because it allows individual identification of the plant leaves, and achieves accurate and easy reconstruction of the whole plant shape from the identified individual leaves.

The operation by the method for plant leaf identification according to the embodiments as described hereinabove may be at least partly implemented as a computer program and recorded in computer-readable recording media. The computer-readable recording media having recorded thereon the program for implementing the operation by the method for plant leaf identification according to the embodiments includes all types of recording devices in which computer-readable data is stored. Examples of the computer-readable recording media include ROM, RAM, CD-ROM, magnetic tape, floppy disk and an optical data storing device. Furthermore, the computer-readable recording media is distributed over computer systems connected via a network, so that the computer-readable code may be stored and executed in a distributed manner. Additionally, functional programs, codes and code segments for implementing this embodiment will be easily understood by those having ordinary skill in the technical field to which this embodiment belongs.

While the present disclosure has been hereinabove described with reference to the embodiments, the present disclosure should not be construed as being limited by these embodiments or drawings, and those skilled in the art will understand that various modifications and changes may be made to the present disclosure without departing from the spirit and scope of the present disclosure set forth in the appended claims.

What is claimed is:

1. A system for plant leaf identification, comprising:
a plant image capturing unit which captures an image of a target plant to generate a plant image;
a plant area image extraction unit which separates a background area and a plant area in the plant image to generate a plant area image including the plant area;
a plant area image skeletonization unit which skeletonizes the plant area image to generate a skeletonized plant area image;
a candidate leaf path generation unit which identifies root vertices, junction vertices and leaf tip vertices in the skeletonized plant area image, and generates a plurality of candidate leaf paths by calculating possible paths along the skeletonized plant area image from each root vertex, among the root vertices, to each leaf tip vertex, among the leaf tip vertices; and
a final leaf path reconstruction unit which reconstructs a final leaf path set matching the plant image by determining a similarity of a candidate leaf path, among the plurality of candidate leaf paths, to a real leaf, and selecting one or more of the plurality of candidate leaf paths as the final leaf path based on the determination.

2. The system for plant leaf identification according to claim 1, wherein the plant area image extraction unit determines an initial plant area and an initial background area through Laplacian filtering, and separates the initial plant area and the initial background area as a plant area and a background area according to a color distribution probability model for the plant area and a color distribution probability model for the background area.

3. The system for plant leaf identification according to claim 2, wherein the plant area and the background area are identified as parameters,
the plant area image extraction unit updates each parameter by reflecting parameter values determined as the plant area and the background area on the color distribution probability model for the plant area and the color distribution probability model for the background area, and repeats the separation of the plant area and the background area using an updated distribution probability model, and
the separation of the plant area and the background area repeats until the parameter of the color distribution probability model for the plant area and the parameter of the color distribution probability model for the background area are not updated any longer.

4. The system for plant leaf identification according to claim 1, wherein the skeletonized plant area image includes a thinned plant area represented by a black thin line, and
a pixel included in the thinned plant area is identified to be the root vertex, the junction vertex or the leaf tip vertex according to characteristics of eight neighbor pixels surrounding the pixel.

5. The system for plant leaf identification according to claim 4, wherein when at least three of the eight pixels surrounding the pixel correspond to the thinned plant area, the candidate leaf path generation unit identifies the pixel to be the junction vertex.

6. The system for plant leaf identification according to claim 4, wherein the final leaf path reconstruction unit calculates a slope of a pixel corresponding to the thinned plant area, and calculates a leaf path likelihood of the candidate leaf path as an indicator indicating slope similarity of the pixel and neighboring pixels.

7. The system for plant leaf identification according to claim 6, wherein the final leaf path reconstruction unit determines a path set in which a sum of cost functions of a path graph composed of the junction vertices, the root vertices, the leaf tip vertices and edges is minimum to be the final leaf path set, and the final leaf path set is determined to include all the edges.

8. A method for plant leaf identification, comprising:
capturing an image of a target plant to generate a plant image;
separating a plant area and a background area in the plant image to generate a plant area image including the plant area;
skeletonizing the plant area image to generate a skeletonized plant area image;
identifying a root vertex, a junction vertex and a leaf tip vertex in the skeletonized plant area image, and generating a plurality of candidate leaf paths by calculating possible paths along the skeletonized plant area image from each root vertex, among the root vertices, to each leaf tip vertex, among the leaf tip vertices; and
reconstructing a final leaf path set matching the plant image by determining a similarity of a candidate leaf path, among the plurality of candidate leaf paths, to a real leaf, and selecting one or more of the plurality of candidate leaf paths as the final leaf path based on the determination.

9. The method for plant leaf identification according to claim 8, wherein the generating of a plant area image comprises:
determining an initial plant area and an initial background area through Laplacian filtering; and
separating the initial plant area and the initial background area as a plant area and a background area according to a color distribution probability model for the plant area and a color distribution probability model for the background area.

10. The method for plant leaf identification according to claim 9, wherein the plant area and the background area are identified as parameters,
the separation of the plant area and the background area comprises updating each parameter by reflecting parameter values determined as the plant area and the background area on the color distribution probability model for the plant area and the color distribution probability model for the background area, and repeatedly performing the separation of the plant area and the background area using an updated distribution probability model, and
the repeatedly performing of the separation of the plant area and the background area repeats until the parameter of the color distribution probability model for the plant area and the parameter of the color distribution probability model for the background area are not updated any longer.

11. The method for plant leaf identification according to claim 8, wherein the skeletonized plant area image includes a thinned plant area represented by a black thin line, and
a pixel included in the thinned plant area is identified to be the root vertex, the junction vertex or the leaf tip vertex according to characteristics of eight neighbor pixels surrounding the pixel.

12. The method for plant leaf identification according to claim 11, wherein when at least three of the eight pixels surrounding the pixel correspond to the thinned plant area, the pixel is identified to be the junction vertex.

13. The method for plant leaf identification according to claim 11, wherein the reconstructing of a final leaf path comprises calculating a slope of a pixel corresponding to the thinned plant area, and calculating a leaf path likelihood of the candidate leaf path as an indicator indicating slope similarity of the pixel and neighboring pixels.

14. The method for plant leaf identification according to claim 13, wherein the reconstructing of a final leaf path set comprises determining a path set in which a sum of cost functions of a path graph composed of the junction vertex, the root vertex, the leaf tip vertex and edges is minimum to be the final leaf path set, and the final leaf path set is determined to include all the edges.

* * * * *